July 19, 1955     W. H. KUHN ET AL     2,713,428

MATERIAL STORAGE SYSTEM

Filed Jan. 18, 1951     2 Sheets-Sheet 1

INVENTORS
Wayne H. Kuhn, and
Wilfred R. Reichenstein

July 19, 1955     W. H. KUHN ET AL     2,713,428
MATERIAL STORAGE SYSTEM
Filed Jan. 18, 1951     2 Sheets-Sheet 2
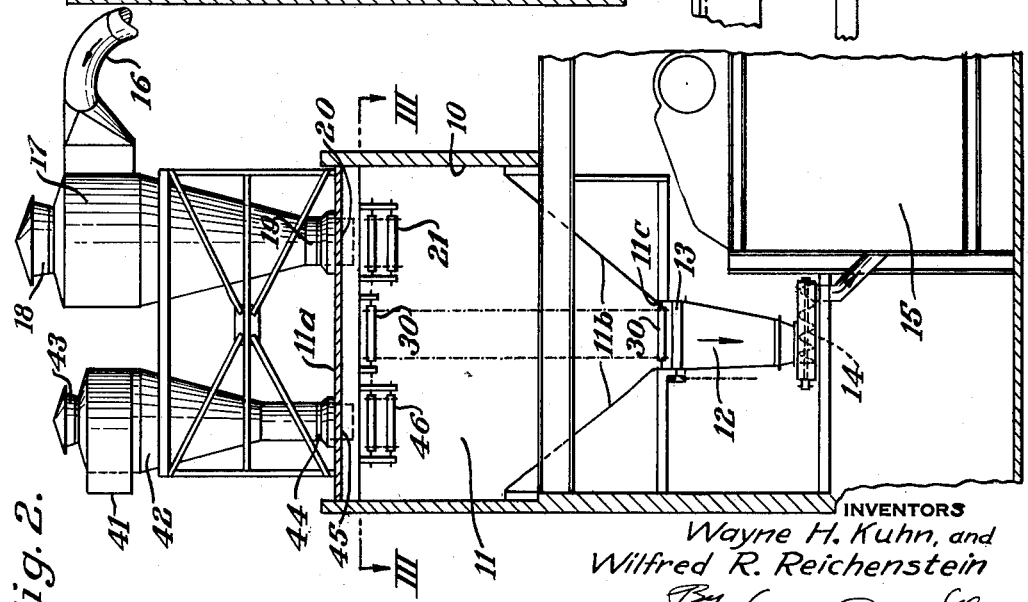
INVENTORS
Wayne H. Kuhn, and
Wilfred R. Reichenstein United States Patent Office 2,713,428
Patented July 19, 1955

2,713,428

MATERIAL STORAGE SYSTEM

Wayne H. Kuhn and Wilfred R. Reichenstein, Marion, Ohio, assignors to The Fairfield Engineering Company, Marion, Ohio, a corporation of Ohio Application January 18, 1951, Serial No. 206,622

2 Claims. (Cl. 214—16)

This invention relates to a system for receiving, storing and discharging material, especially in the case of sawdust and the like collected and fed to burners.

Sawdust resulting from manufacturing processes is customarily collected and fed through a bin into furnace hoppers to recover the heat value of the waste sawdust. In the past it has been found that the sawdust tends to compact and arch in the bin so that it does not feed into the hoppers, and in some cases this has resulted in fires caused by flashbacks from the furnace through an empty furnace hopper into the bin.

In accordance with our invention the problems of arching and flashback in a bin for sawdust and the like are greatly reduced by the use of distributing members which constantly travel through the bin and serve to distribute the sawdust evenly in the bin. One set of these members moves across the top of the bin and another set through the bottom of the bin adjacent the outlet hoppers. These distributing members are preferably mounted on continuous chains, with the chains adjacent the upper openings having their oppositely moving flights close to the upper openings in order to obtain a cross motion for distributing and breaking up the incoming material, and with the chain adjacent the lower openings having a lower flight extending along the bottom of the bin and an upper flight outside of the bin. The chain for the lower openings is preferably driven independently through a variable speed slip drive. In addition, we keep the material moving in the bin by constantly withdrawing the material which has been moved past the hopper openings but has not entered the furnace hoppers and return it to the bin through one of the upper inlets for redistribution in the bin.

Other details, objects and advantages of the invention will become apparent from the following detailed description and in the accompanying drawings. We have shown in the drawings, for purposes of illustration only, the following present preferred embodiment of our invention, in which Figure 1 is a front elevational view of a boiler room, with the front wall removed to show a bin embodying the invention;

Figure 2 is an end view of the boiler room shown in Figure 1, with the end wall removed to show the bin;

Figure 3 is an enlarged horizontal sectional view taken on the line III—III in Figure 2, partially broken away;

Figures 5 and 6 show views corresponding to that of Figure 4 of the runaround drag link chain for the bin outlets into the furnace hoppers.

Figure 1:
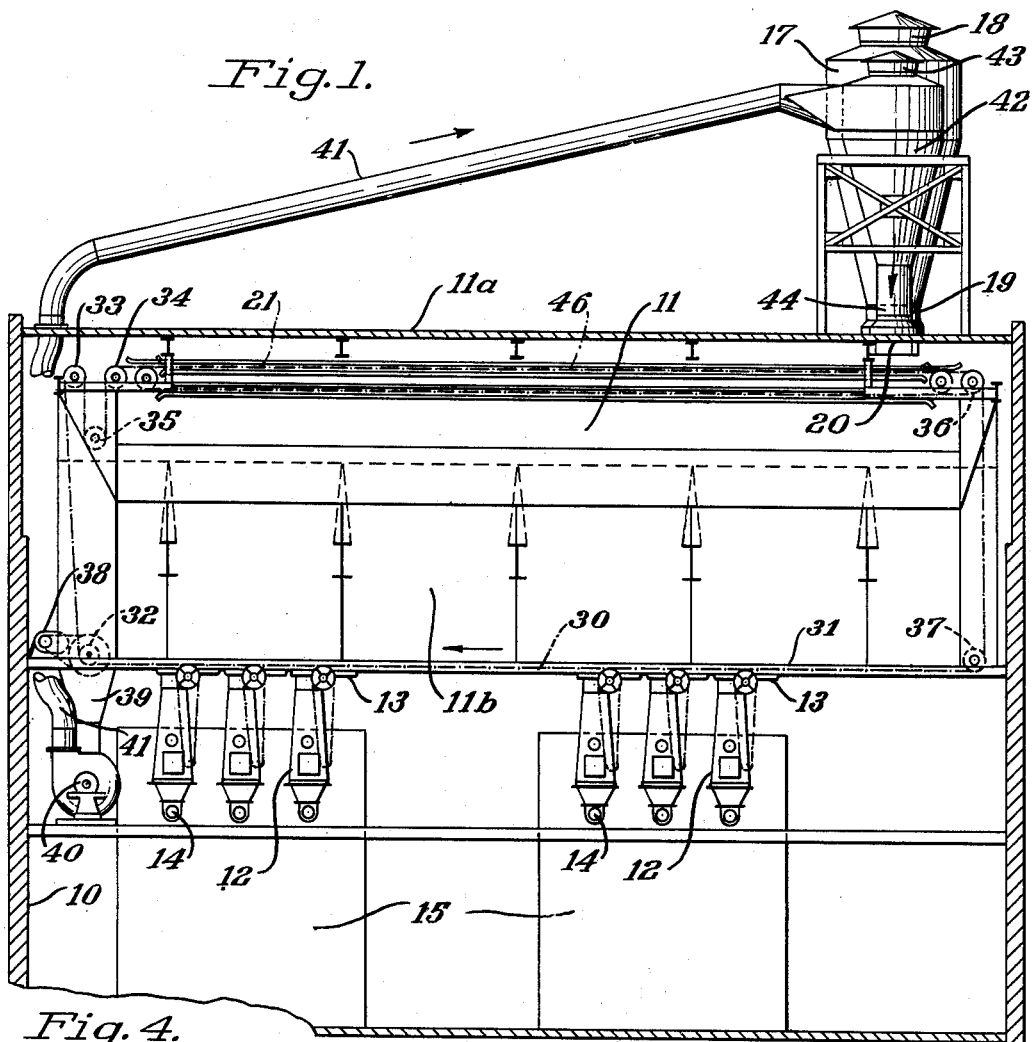

Referring now more particularly to the drawings and considering first the structure shown in Figures 1 and 2, the illustrated apparatus comprises boiler room walls 10 forming the vertical sides of a sawdust storage compartment or bin 11. The bin 11 has a top cover 11a and lower sloping sides 11b forming a trough with a series of bottom openings 11c discharging into a series of hoppers 12. Gates 13 at the top of the hoppers 12 control the inflow of sawdust into the hoppers, and screw feeders 14 convey material from the hoppers 12 into boiler furnaces 15 to fire the furnaces.

Figures 4, 7:
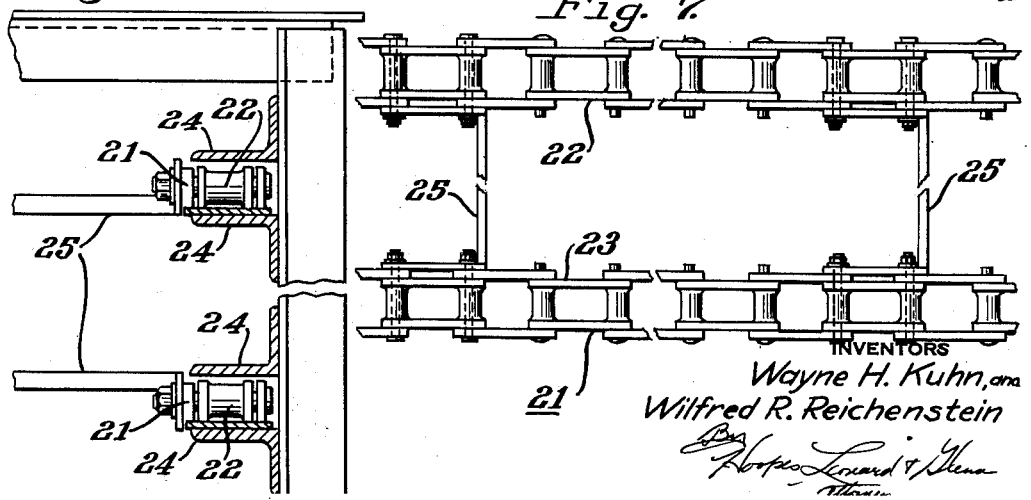
Figure 4 is an enlarged sectional view showing part of a drag link chain and its support adjacent one of the bin inlet openings.
Figure 7 is a plan view of a typical drag link chain used in the bin, with the connecting link partially broken away.

The sawdust for the furnace boilers 15 is received from any suitable source, such as factory waste, and is blown with air under pressure through an inlet conduit 16 tangentially into a cyclone chamber 17, where the air is blown off through an upper outlet 18 and the sawdust is discharged through a lower outlet 19 which extends through an upper inlet opening 20 of the bin 11. A drag link chain 21 is mounted at the top of the bin compartment 11 with two oppositely-moving and horizontally-extending flights passing across the opening 20 beneath the cyclone chamber outlet 19. As shown in Figures 4 and 7, the drag chain 21 comprises a pair of side chains 22 and 23 running on upper and lower rails 24 with drag links 25 extending transversely between the pair of chains 22 and 23. The drag chain 21 is driven by a motor 26 through sprockets 27 on a jackshaft 28 (Figure 3). A pair of idler sprockets 29 carry the opposite end of the chain 21. The upper flight of the drag chain 21 moves from the bin inlet opening 20, which is at one end of the bin 11, toward the opposite end of the bin, and the lower flight moves in the opposite direction (the drag chain 21 moves counterclockwise as viewed in Figure 1).

After the sawdust entering through the inlet opening 20 falls beneath the drag chain 21 it passes down through the bin 11 and is guided by the sloping lower sides 11b of the bin 11 onto the lower flight of a runaround drag chain 30 (Figure 2). This chain is of the same construction as the drag chain 21 and its lower horizontal flight is carried by guide rails 31 (Figure 6) across the bottom of the bin 11 from one end to the other in the same direction as the upper flight of the chain 21. The drag chain 30 then passes around drive sprockets 32, up through the bin, and around idler sprockets 33 and 34 and take-up sprocket 35, and thence passes horizontally (Figure 2) to the opposite end of the bin at the level of the upper flight of the drag chain 21; it then passes around idler sprockets 36 and down through the bin, around idler sprockets 37, and thence horizontally back through the bin over the openings at the bottom of the bin into the hoppers 12. The drive sprockets 32 are driven by a motor 38 through an intermediate hydraulic pump and motor giving the conveyor a variable speed generally ranging from 0 to 2 feet per minute. The hydraulic motor is controlled by a relief valve for overload protection against chain breakage or injury to the motor 38. The lower flight of the runaround drag chain 30 constantly moves sawdust across the bottom of the bin from the end of the bin beneath the opening 20 in order to keep the hoppers 12 full of sawdust. Some of the sawdust is carried past the hoppers 12 and this sawdust is carried by the drag chain 30 into the upper end of a conduit 39 which connects the bottom of the far end of the bin 11 from the inlet opening 20, with the inlet of a blower 40. The outlet of the blower 40 is connected with a conduit 41 which feeds tangentially into a smaller cyclone chamber 42 having an upper air outlet 43 and a lower sawdust outlet 44. The latter outlet extends through a return inlet opening 45 of the bin 11. A drag chain 46 like the drag chain 21 is similarly mounted with horizontal oppositely-moving flights crossing the opening 45 in the same manner as the drag chain 21 across the opening 20. The chain 46 is driven by sprockets 47 keyed on the same jackshaft 28 which drives the chain 21, and the opposite end of the chain 46 is carried by idler sprockets 48. The return inlet opening 45 is at the same level and at the same end of the bin 11 as the opening 20 but is on the other side of the upper flight of the runaround chain 30.

In operation waste sawdust is fed through the conduit 16 into the cyclone chamber 17 and thence onto the drag chain 21. The upper flight of the drag chain 21 tends to carry the sawdust toward the far end of the bin 11 from the inlet opening 20, and the closely adjacent lower reach of the chain 21 moving in the opposite direction tends to break up lumps of the sawdust and to change the direction of the falling sawdust so that it falls evenly into the bin generally beneath the opening 20. The falling sawdust is guided by the sloping lower sides 11b of the bin onto the lower flight of the runaround drag chain 30, and is moved by the chain 30 across the bin openings into the hoppers 12. Most of the sawdust usually falls into the hoppers to keep them full as sawdust is withdrawn from the bin for burning, and the balance is moved on to the far end of the bin where it is withdrawn from the bin by the blower 40 for recirculation. The blower 40 blows the recirculated sawdust through the cyclone chamber 42 with sufficient force to expel the excess air from the top of the chamber 42 and to concentrate the recirculated sawdust at the bottom of the chamber 42. The recirculated sawdust thence passes down onto the drag chain 46 where it is broken up and distributed by the oppositely-moving flights of the drag chain 46. It then is guided by the sloping lower sides 11b of the bin onto the lower flight of the runaround drag chain 30 and there joins the sawdust entering through the first inlet opening 20 to repeat the same general cycle. The sawdust in the bin is constantly fed to the hoppers or recirculated, so that the hoppers are kept full and the sawdust is prevented from compacting.

While we have illustrated and described a present preferred embodiment of the invention, it will be recognized that the invention is not limited thereto but may be otherwise variously embodied and practiced within the scope of the appended claims.

We claim:

1. Material handling and storage apparatus comprising a compartment having a trough-shaped bottom with an outlet opening at the bottom of the trough, and having a top with a pair of spaced inlet openings, a pair of endless flexible bands having horizontally-extending flights mounted adjacent the respective inlet openings, another flexible endless band having a lower flight mounted to move along the bottom of the bin past the outlet opening with the return flight extending over the top of the compartment between the first-mentioned bands, said bands each comprising a pair of spaced chains having spaced drag links extending transversely between them, means to drive the first-mentioned pair of bands in the same direction and independent variable-speed driving means connected to drive the said other band with its lower flight moving in the same direction as the upper flights of the first-mentioned pair of bands, a pair of cyclone chambers having their apex outlet openings dischargeable through the respective compartment inlet openings, a blower having an inlet conduit connecting it with the interior of the compartment adjacent the said other band after it passes the outlet opening and having an outlet conduit connected to discharge through one of said cyclone chambers, a hopper mounted beneath said outlet opening, and means to drive said blower to withdraw material moved past said lower outlet opening by said other band and to recirculate the material into the compartment through the said one of said cyclones.

2. Handling and storage apparatus for sawdust and the like, comprising a compartment having sides sloping down toward a horizontally elongated bottom section of the compartment, at least one hopper mounted below the compartment with an opening through said bottom section into the hopper, means mounted over the compartment to discharge material into the compartment, a belt mounted to move with horizontal upper and lower flights adjacent the lower end of said discharge means, spaced members mounted on said belt to distribute material passing from the discharge means into the compartment, elevator means having a material-receiving end adjacent one end of said bottom section of the compartment and having a material discharge end disposed to recirculate material into the compartment, a belt mounted to move with horizontal upper and lower flights adjacent the discharge end of the elevator means, spaced material-distributing members mounted on the latter belt to distribute material passing from said discharge end back into the compartment, a drag chain mounted to move in a continuous loop with one flight passing horizontally along the bottom section of the compartment past said opening and thence to said receiving end of the elevator means, and means to drive said belts, chain and elevator means simultaneously, whereby material fed into the compartment is distributed by the first belt into the compartment, while some of the material is carried to the hopper opening and the balance is carried to the elevator means for recirculation and redistribution into the compartment, thus keeping the hopper full and the compartment free of arching of the material therein.

References Cited in the file of this patent

UNITED STATES PATENTS

| Number | Name | Date |
|---|---|---|
| 111,615 | Crampton | Feb. 7, 1871 |
| 259,387 | Harrison | June 13, 1882 |
| 281,319 | Thomas | July 17, 1883 |
| 887,085 | Gardner | May 12, 1908 |
| 1,420,726 | Montague et al. | June 27, 1922 |
| 1,465,050 | Kinsley | Aug. 14, 1923 |
| 1,475,596 | Redler | Nov. 27, 1923 |
| 1,570,172 | O'Neil | Jan. 19, 1926 |
| 2,035,018 | Smith | Mar. 24, 1936 |
| 2,156,878 | De Los Sinden | May 2, 1939 |
| 2,194,144 | Gill | Mar. 19, 1940 |
| 2,209,476 | Redler | July 30, 1940 |

FOREIGN PATENTS

| Number | Country | Date |
|---|---|---|
| 203,010 | Germany | Oct. 14, 1908 |
| 806,266 | France | Dec. 11, 1936 |